United States Patent [19]

Bargeton et al.

[11] 4,402,075
[45] Aug. 30, 1983

[54] STEP-BY-STEP REMOTE LOCATING SYSTEM FOR REPEATERS IN A PCM LINK

[75] Inventors: Gilbert L. Bargeton, Paris; Claude P. Beynie, La Varenne, both of France

[73] Assignee: Societe Anonyme de Tele Communication, Paris, France

[21] Appl. No.: 277,101

[22] Filed: Jun. 25, 1981

[30] Foreign Application Priority Data

Jul. 2, 1980 [FR] France ............... 80 14769

[51] Int. Cl.³ .................................... H04B 3/46
[52] U.S. Cl. ........................ 370/15; 179/175.31 R; 370/97
[58] Field of Search ............... 370/13, 15, 97; 179/175.31 R, 175.3 R

[56] References Cited

U.S. PATENT DOCUMENTS 4,161,635 7/1979 Wolaver ........................... 370/15
4,336,610 6/1982 Steiner ..................... 179/175.31 R
4,355,215 10/1982 Legras et al. ............. 179/175.31 R

FOREIGN PATENT DOCUMENTS 1551172 8/1979 United Kingdom ............... 370/15

Primary Examiner—Gerald L. Brigance

Attorney, Agent, or Firm—Lowe, King, Price & Becker

[57] ABSTRACT

A step-by-step remote locating system for a digital bidirectional transmission link includes repeater pairs between a monitoring end equipment and a remote equipment. The monitoring equipment transmits remote location sequences and a locate end interruption on a forward channel. The sequences are intended to command closing and opening respective loop-back paths between two repeaters of the pairs. Each sequence comprises a predetermined integral number k of nonconsecutive interruptions in a transmitted digital signal throughout a predetermined period and, with the exception of the first sequence, an interruption preceding the k interruptions intended for opening the loop-back path of the preceding pair. The remote locate circuit associated with each repeater pair comprises an interruption counter. When the count of the counter is k the respective loop-back path to the monitoring equipment is closed. When the count is not equal to k, the loop-back path is opened. The count of the counter automatically returns to zero in response to a count less than k at the end of the predetermined period or in response to a locate end interruption longer than the predetermined period.

15 Claims, 12 Drawing Figures

STEP-BY-STEP REMOTE LOCATING SYSTEM FOR REPEATERS IN A PCM LINK

BACKGROUND OF THE INVENTION

1. Field of the Invention

The present invention relates to a system for remotely locating pairs of intermediate amplifying circuits which are included between a monitoring equipment and a remote equipment of a bidirectional PCM transmission medium.

More particularly, the invention concerns a remote locating system in which the remote location of intermediate amplifying circuit pairs is performed step-by-step, namely with no special addressing signal peculiar to each pair. No auxiliary means for transmitting the remote locate signals are required other than the communication medium normally carrying the PCM data signals and mixers for superimposing frequencies. Such a system does not have to employ intermediate amplifying circuit means, such as repeater input and output power-separation filters, frequency filters and demodulators or a circuit for detecting an address peculiar to the particular pair. The result is simplicity of the remote locate circuit which is associated with each pair of intermediate amplifying circuits, together with relatively low manufacturing costs, reduced current consumption and excellent reliability.

Remote location as employed in the invention is based on the detection of interruptions in the PCM signal, which interruptions do not normally occur in the digital signal carried by the forward channel of the link from the monitoring equipment to the remote equipment. These interruptions have characteristics that adhere to the transparency rules set forth in the corresponding notes and recommendations distributed by international organizations in the telephone transmission field.

2. Description of the Prior Art

A known remote location procedure with no addressing is described in the article by Reginhard Pospischil entitled "Digital System DS 34CX for Transmitting 34 M bit/s Signals on Coaxial Pairs", published in Telcom report 2 (1979) Special Issue "Digital Transmission", pages 100 to 104, in particular under paragraph "Monitoring and fault Locating" or in U.K. Pat. No. 1,551,172, published Aug. 22, 1979.

The remote location procedure described in these two documents makes use of first and second interruptions of predetermined lengths as both a remote locate sequence, also termed "loop closure signal" of a pair intermediate circuits and a locate end interruption.

The remote locate sequence is made up of a single interruption, i.e. a series of several consecutive digits in the zero state. The predetermined number of these zero digits is equal to an integral multiple of the greatest number of zero digits likely to be contained in the PCM data signal normally conveyed in the link. For example, when the code used in the link is the HDBn bipolar code, the remote locate sequence is composed of an integral number of n+1 digits in the zero state. All the remote locate sequences are identical.

In order to loop the two intermediate amplifying circuits of a pair to the monitoring equipment, an interruption, referred to as a "preparation signal" is emitted by the monitoring equipment so as to energize the remote locate circuits of all the pairs. A number of identical remote locate sequences equal to the selected pair rank in the link is then emitted on the forward channel from the monitoring equipment to achieve a connection between two amplifying circuits of said pair through the respective loop-back path. The time interval between two remote locate sequences or two first interruptions lasts a predetermined length of time, approximately 100 µs, and is filled with the digits of a conveyed digital signal such as a test signal.

To break the loop, a second interruption, or locate end interruption, is transmitted on a forward line channel by the monitoring equipment. The remote locate circuit associated with the previously looped pair detects this second interruption and controls switchable looping and unlooping means so as to open the loop-back path. The second interruption is also composed of a series of consecutive zero-state digits numbering more than those contained in a remote locate sequence.

During the routing of the PCM signal, it is known that interference interruptions may be present due, for example, to factors outside the link such as lightning or factors within the link, such as repeaters functioning abnormally for a short period of time. These interference interruptions can be roughly as wide as the remote locate sequences in the previously known procedure. In this case, the interference interruptions can cause untimely looping which upsets not only the PCM link transmission in normal operation, but also the various remote locations during a remote locate and test procedure.

OBJECT OF THE INVENTION

The main object of this invention is to provide a step-by-step remote locating system which is free of any faulty looping in the link caused by interference pulses.

SUMMARY OF THE INVENTION

In accordance with this object, there is provided a system for step-by-step remote locating pairs of first and second amplifying means respectively included in first and second transmission channels of a bidirectional digital transmission medium between first and second end means. The first end means comprises first generating means for generating on the first channel remote locate sequences composed of first interruptions in a digital signal conveyed by the first channel, and second generating means for generating a locate end interruption in the digital signal on the first channel. Each interruption is longer than the duration of the maximum series of consecutive zero digits that the digital signal can contain and each of the first interruptions is shorter than the locate end interruption. Each of the remote locate sequences is intended for closing a loop-back path between the first and second emplifying means for a respective pair and comprises a predetermined integral number k ($k \geq 2$) of first nonconsecutive interruptions during a predetermined period of time and, with the exception of the first sequence generated and intended for the nearest amplifying means pair of the first end means, an interruption which precedes the first interruptions of the remote locate sequence and which is intended for opening the loop-back path of the preceding amplifying means pair. Each pair of amplifying means is associated with (a) switching means for closing and opening the respective loop-back path of the amplifying means pair, (b) detecting means for detecting the locate end interruption, and (c) detecting and counting means. The detecting and counting means detects and counts the first interruptions thereby to control the respective switching means so that the count of the detecting and counting means is respectively equal to and different from k, loop-back path position is closed and opened. The detecting and counting means automatically returns to zero when the count thereof is less than k upon completion of said predetermined period of time or when the locate end interruption detecting means detects a locate end interruption.

Because each remote locate sequence is composed of a predetermined integral number k of non consecutive interruptions, i.e., spaced out by an interval filled by a PCM signal, where k is greater than or equal to 2 and is relatively high in practice, e.g. 9, there is a reduced risk of untimely looping by interference interruptions since the probability of a number k of interference interruptions being produced during the predetermined period of time is very small. Moreover, even if one or several interference interruptions are inserted in a remote locate sequence, looping does not occur as looping can strictly only arise for k interruptions included in the predetermined period of time.

BRIEF DESCRIPTION OF THE DRAWING

Other advantages will be more clearly apparent from the following more particular description of preferred embodiments of this invention in reference to the corresponding accompanying drawings in which.

DESCRIPTION OF THE PREFERRED EMBODIMENT

Figure 1:
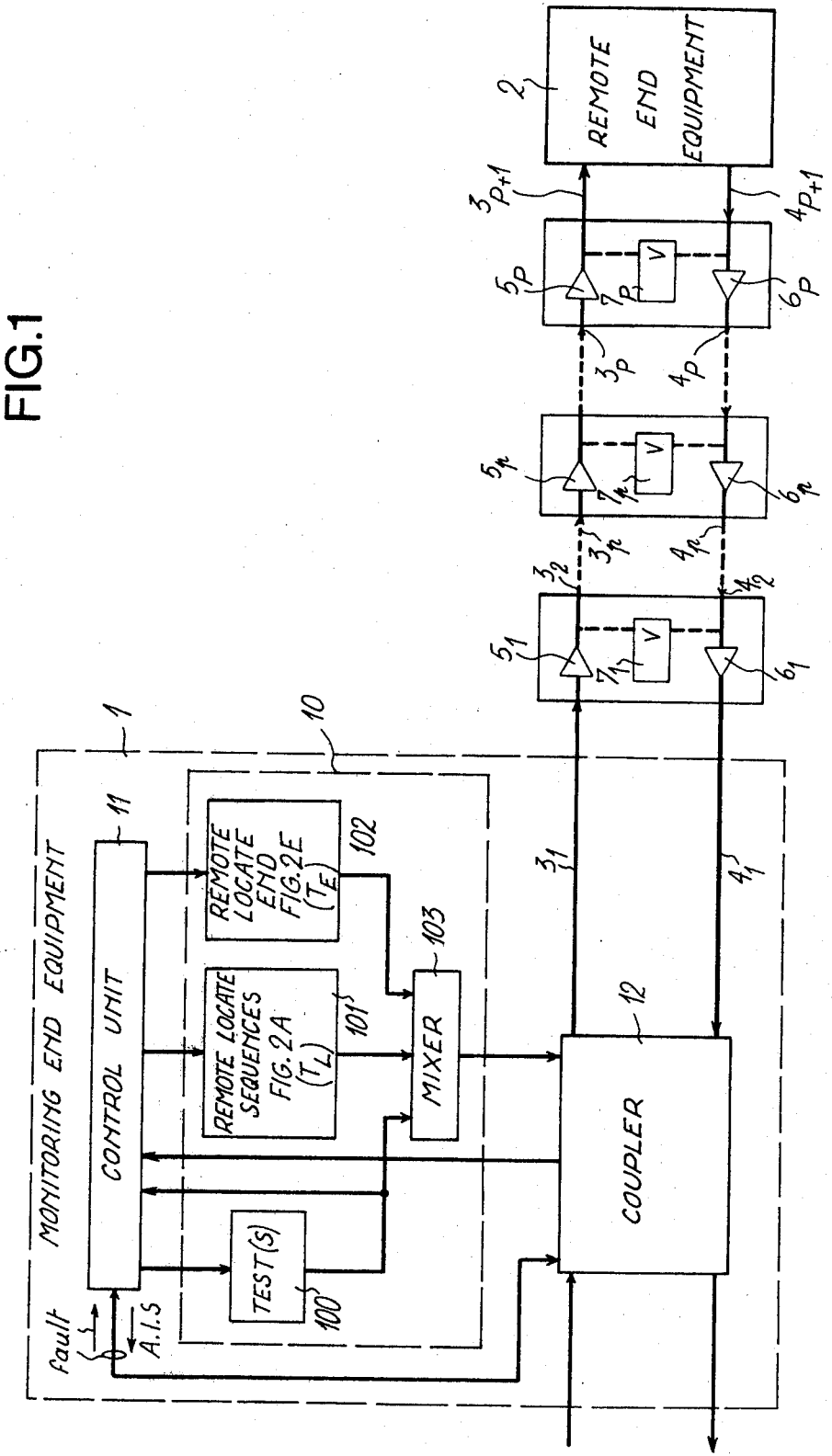
FIG. 1 is a schematic block diagram of a remote locate system for a two-way PCM communication line having repeater pairs to which the invention relates.

The embodiment which is now described, relates to a 2,048 kbits/s bidirectional PCM digital communication medium located between a first equipment in the form of a monitoring end equipment 1 and a second remote end equipment 2. Between these two end equipments 1 and 2, the communication medium includes a four-wire line divided into P line sections having component elements referenced by numbers with integral indices 1 to P respectively. A line section indicated by the index p, where p varies from 1 to P comprises two pairs of balanced coaxial cables $3_p$-$4_p$ acting as communication medium which is located at one end of the section on one side of the equipment 1, and a pair intermediate amplifying means in the form of repeaters $5_p$-$6_p$ which are located at the other end of the section on one side of the equipment 2. The last section which is connected to the remote equipment 2, designated by the index P+1, comprises only a segment of balanced coaxial cable pairs $3_{P+1}$ and $4_{P+1}$ which connect the last pair of repeaters $5_p$-$6_p$ to the remote equipment 2. The elements $3_1$-$5_1$ to $3_p$-$5_p$ and $3_{p+1}$ are assigned to a first channel or forward line channel 3 for transmitting a digital signal from the monitored equipment 1 to the remote equipment 2, and the elements $4_{P+1}$ and $6_P$-$4_P$ to $6_1$-$4_1$ are assigned to a second channel or backward line channel for transmitting another digital signal from the remote equipment 2 to the monitoring equipment 1.

All the repeaters 5 and 6 are identical. Each of repeaters $5_p$ and $6_p$, where p varies from 1 to P, comprises all the means for suitably retransmitting the received PCM signal. Thus, each of repeaters $5_p$ and $6_p$ includes input transcoding means for converting an incoming line-code signal into a binary-coded signal, retiming and reshaping means, amplifying and equalizing means, gain regulating means and output transcoding means for converting the binary-code amplified signal into the line-code outgoing signal. Each pair of repeaters $5_p$-$6_p$ is also associated with a remote locate circuit $7_p$. Circuit $7_p$ makes it possible to loop the link, i.e. to form a "loop-back" path by switchable looping and unlooping means via the circuits $5_p$, $7_p$ and $6_p$ under control of the monitoring equipment 1 and to disconnect the following repeater pairs $5_{p+1}$-$6_{p+1}$ to $5_P$-$6_P$ and the remote equipment 2 with respect to the monitoring equipment 1.

In the remote locating circuit $7_p$, looping is performed in response to the detection of a first remote locate signal that is transmitted by the the monitoring end equipment 1 in the forward direction on the forward channel including cables $3_1$ to $3_{P+1}$.

On FIG. 1 only the circuits engaged in remote location are shown in the block of the monitoring equipment 1. It goes without saying that the monitoring equipment 1, together with the equipment 2, includes all the circuits (not shown) required for repeater remote location. Exemplary circuits in equipments 1 and 2 where applicable, are remote supplying means for delivering the current through the line to the repeater pairs, test signal generating means for providing special test signals during the remote locating phase which are transmitted in the forward direction along the forward channel, signal detecting and analyzing means for receiving the test signals and the PCM data signal which is normally transmitted in normal operation with a view to detecting transmission faults in line. Such faults cover, for instance, a rate loss in the received PCM signal, a PCM signal error rate outside a given range, an absence of the received PCM signal, an unacceptable attenuation of the received PCM signal, etc. For the embodiment described herein where the line-code is a HDBn code, e.g. the HDB3 code, a transmission fault can also be a bipolarity violation of the HDB3 bipolar code in the received signal. Each end equipment 1, 2 further comprises a generator for producing an Alarm Indication Signal (A.I.S.) which is derived outside the line, downstream of the end equipment, in response to the detection of a fault. The end equipment can include a switching inhibition signal generator which supplies a Switching Inhibition Signal (S.I.S.) in the line in response to an alarm indication signal coming from outside the line (see for instance U.S. patent application Ser. No. 223,092 filed Jan. 7, 1981 where each terminal equipment is included in an end station serving a plurality of bidirectional working PCM lines included in a transmission link).

In FIG. 1 only the remote locate signal generator 10 and the central remote control unit 11 are shown in the monitoring end equipment 1. The control unit 11 is organized about a microprocessor which is associated with a display board including an alphanumerical keyboard and a display console which shows, in addition, to the operator the rank 1 to P of the remote located repeater pair. Using the keyboard, a series of remote locate sequences can be supervised manually or automatically depending on the test signal selected and the measurements taken. The control unit 11 is preferably removable and disconnectable from the rest of the monitoring equipment 1 via a suitable interface such that the unit may be carried in a so-called maintenance case, enabling the unit to used for measurements on other lines.

Control unit 11 can simultaneously monitor several PCM digital lines in a communication PCM trunk serving an end station.

Figure 2:
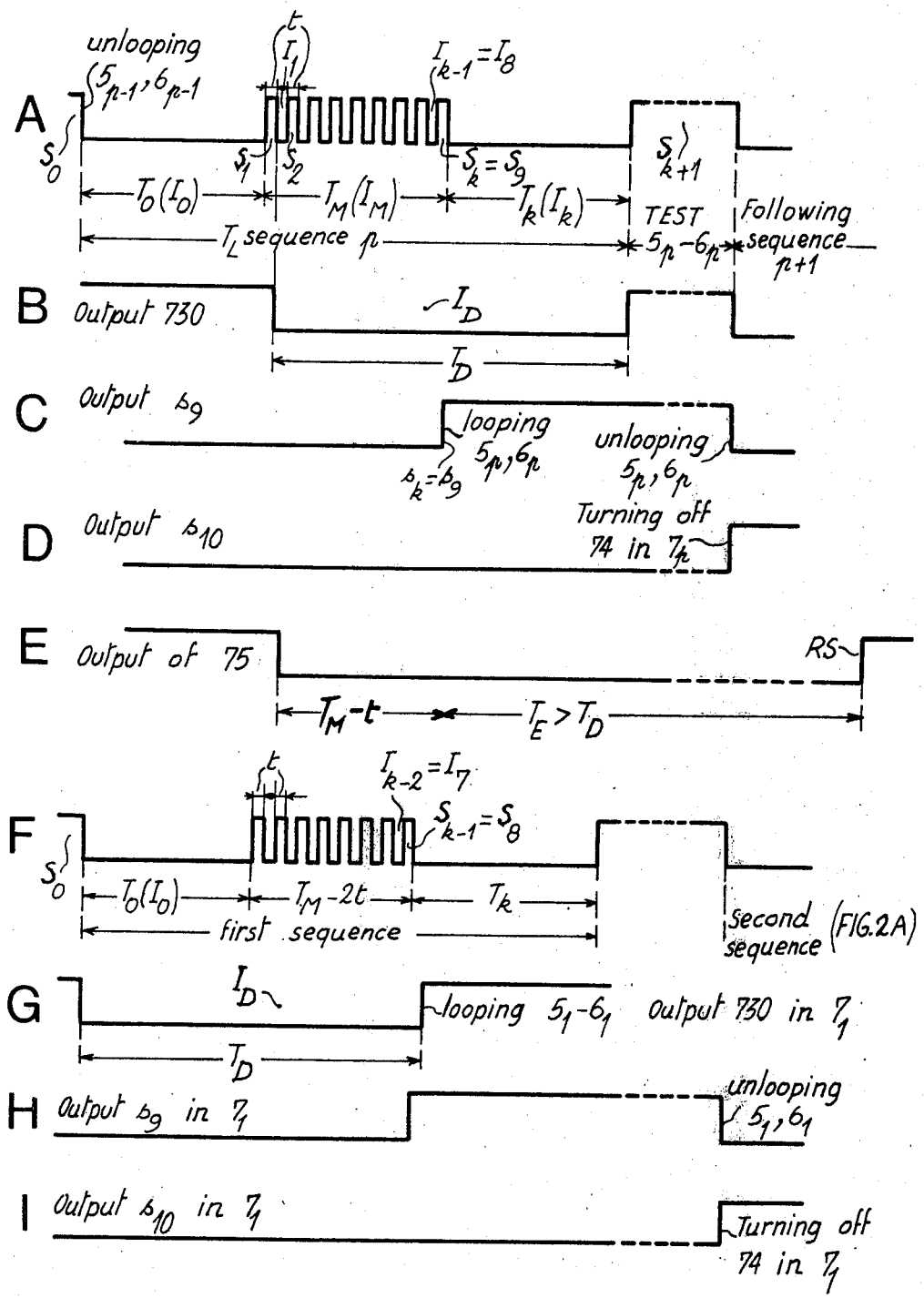
FIGS. 2A to 2I are waveforms of digital and logic signals inherent in the remote locating of a repeater pair.

Before detailing the remote locate circuit $7_p$ for a pair of repeaters $5_p$-$6_p$ (the structure of circuit $7_p$ is closely tied with the remote locate signals in accordance with the invention) reference is made to FIG. 2. FIG. 2A is an illustration of the envelope of a recurrent sequence in the first remote locate signal. The sequence of FIG. 2A is intended to control looping between any given pair of repeaters, i.e. for forming a loop-back path which connects one terminal of the forward repeater $5_p$, such as its output, to one terminal of the backward repeater $6_p$, such as its input. As already pointed out, since the remote locate procedure is of the step-by-step kind, the sequence peculiar to remotely locating the repeater pair $5_p$-$6_p$ having the rank p must cause, before looping this repeater pair, unlooping of the preceding repeater pair. The special case of the first repeater pair $5_1$-$6_1$, with no pair preceding it, is broached at a later stage.

The remote locate sequence is composed of three successive fields or great time intervals $I_0$, $I_M$ and $I_k$. The first field $I_0$ is preceded by a field $S_0$ which includes any given PCM signal S. The field $I_0$ has no signal, i.e. is entirely at the low logic level or includes only zero digits. The second field $I_M$ is composed of an alternate series of a predetermined integral number k of sub-fields or small time intervals $S_1$ to $S_k$ which are filled by the PCM signal S preceeding field $I_0$, and of k−1 sub-fields $I_1$ to $I_{k-1}$ that are signal-less, i.e. fully composed of zero digits. The third field $I_k$, entirely at the low logic level, is followed by a field $S_{k+1}$ composed of the signal S. For the following sequence, the field $S_{k+1}$ is the field $S_O$. The sub-fields $S_1$ to $S_k$ and $I_1$ to $I_{k-1}$ preferably have durations which are equal to a predetermined value. Sub-fields $S_1$ to $S_k$ and $I_1$ $I_{k-1}$, when taken as a whole in the field $I_M$, take up the middle of the remote locate sequence, i.e. the widths $T_0$, $T_k$ of the first and third fields $I_0$, $I_k$ are equal.

In a preferred embodiment, such a remote locate sequence for a 2048k bits/s PCM communication system having an HDB3 line code, presents the following time characteristics which have been selected in terms of the criteria set forth hereinafter:

sequence duration $T_L = 102$ ms;
width of each field $I_0$, $I_M$, $I_k$:
  $T_0 = T_M = T_k = (2k-1)t = 34$ ms;
width, t of each sub-field $S_1$ to $S_k$ and $I_1$ to $I_{k-1} = 2$ ms;
number of signal free fields or interruptions $I_0$ to $I_k = 10$;
minimum duration $T_m$, of the field $S_O$ preceding the sequence or $S_{k+1}$ following the sequence, i.e. time separating two successive remote locate sequences, $= 50$ μs;
any given PCM signal S is a pseudorandom signal which is produced from a pseudorandom generator 100 included in the monitoring end equipment 1.

As seen below, in the pth remote locate sequence, the first negative going, trailing edge corresponding to the start of the interruption $I_0$ causes unlooping of the preceding repeater pair $5_{p-1}$-$6_{p-1}$ and is not received by the remote locate circuit $7_p$. The negative going edge corresponding to the start of the interruption $I_k$ which is detected like the preceding $I_1$ to $I_{k-1}$, causes looping of the repeaters $5_p$-$6_p$.

The remote locate principle of the invention lies in counting the number of interruptions in a PCM signal, i.e. the number of signal free intervals at the zero logic level, which are detected and counted in the remote locate circuits $7_l$ to $7_p$. Such a remote locate circuit is preferably structured around monostable flip-flops which detect such interruptions, and a counter which counts them.

Figure 3:
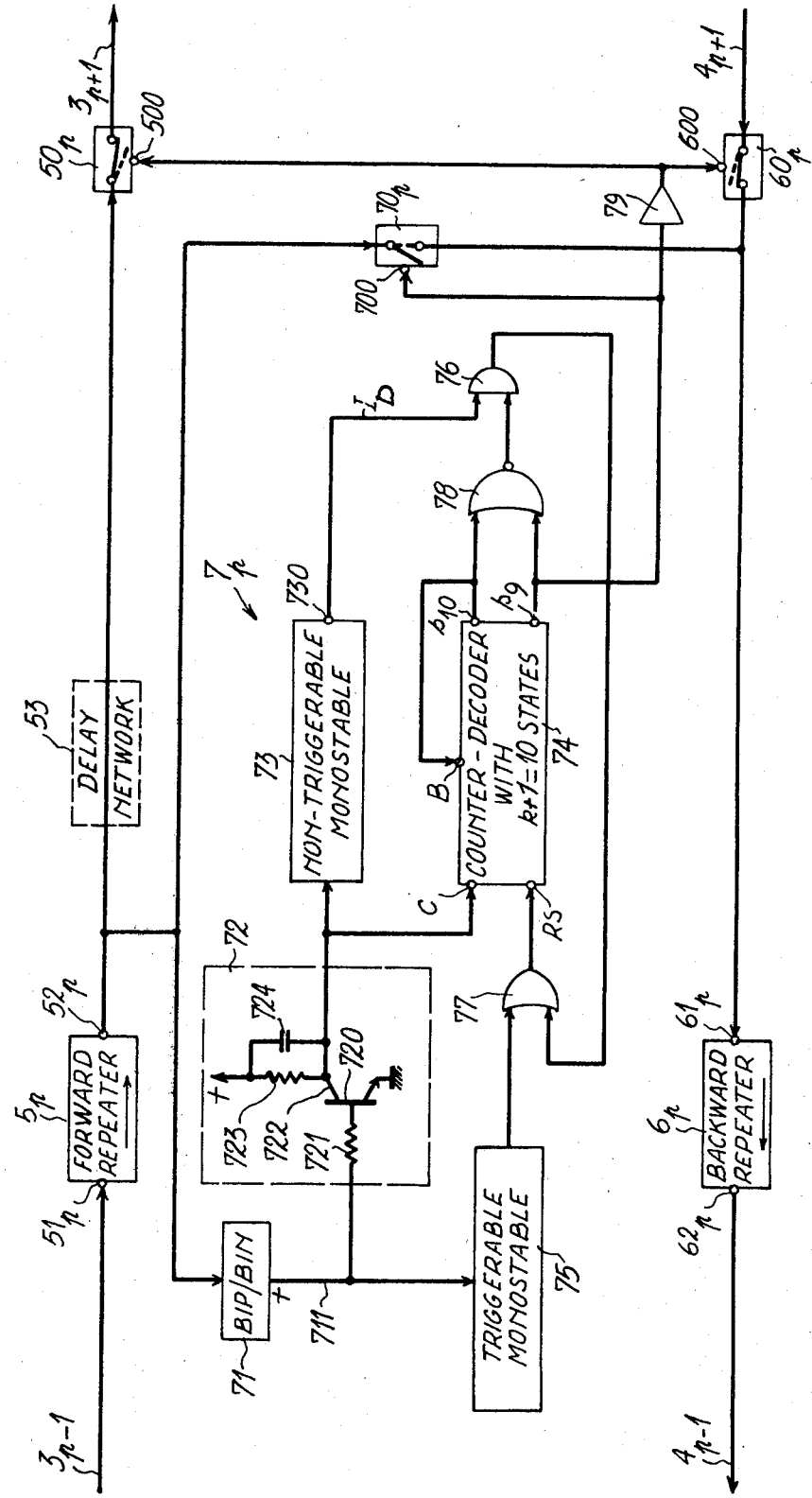
FIG. 3 is a detailed block diagram of the remote locate circuit associated with a repeater pair.

A remote locate circuit $7_p$ is shown in FIG. 3. In this block-diagram also shown are the associated forward repeater $5_p$ and backward repeater $6_p$ which will be looped, i.e. connected through the closing of the loop-back path under the control of the remote locating circuit $7_p$. Looping and unlooping are performed by switchable looping and unlooping means which comprise, for instance, three bipolar switches $50_p$, $60_p$ and $70_p$. Switches $50_p$ and $60_p$ are inserted in series in the forward and backward channels respectively. The third switch $70_p$, connected in the loop-back path, includes terminals respectively connected to the output $52_p$ of the forward repeater $5_p$ and the input $61_p$ of the backward repeater $6_p$.

In normal operation in the absence of remote location of the repeater pair $5_p$-$6_p$ in question, the switches $50_p$ and $60_p$ are closed, as indicated by the position of the movable contacts in full lines. In the embodiment depicted in FIG. 3, the first switch $50_p$ connects the output $52_p$ of the forward repeater $5_p$ to the upstream or entrance end of the following line section $3_{p+1}$ and the second switch $60_p$ connects the downstream or emergent end of the preceding line section $4_{p+1}$ to the input $61_p$ of the backward repeater $6_p$. On the other hand, the third switch $70_p$ opens the loop-back path.

For the embodiment illustrated in FIG. 3, a remote locate circuit $7_p$ comprises: (a) a bipolar to binary converter 71; (b) inhibiting means for inhibiting any interruption in the data PCM signal, which inhibiting means takes the form of a timing circuit 72 having a time constant $t_m$; (c) detecting and counting means for detecting and counting remote locate signal interruptions, which detecting and counting means chiefly comprises a non-retriggerable monostable flip-flop 73 and a counter-decoder 74 having at least $k+1 = 10$ possible states; (d) second detecting means including a retriggerable monostable flip-flop 75, and (e) other logic components 76 to 79.

With simplified logic in mind, the remote locate circuit 7 operates only on one of the component binary signals HDB3+ and HDB3−. The state "1" bits in the binary signal HDB3+ correspond solely to the positive digits of the signal in code HDB3 which are carried by the line, and the state "1" bits of the binary signal HDB3− correspond solely to the negative digits of the signal in code HDB3. It is assumed that the bipolar-to-binary converter 71 converts the bipolar signal HDB3 which is delivered from the output $52_p$ of the forward repeater $5_p$ into the positive digit binary signal HDB3+.

The timing circuit 72 comprises a common-emitter NPN bipolar transistor 720, connected to base resistance 721 in turn connected to the output lead 711 of the converter 71 which supplies the binary signal HDB3+. The collector 722 of the transistor 720 is connected to the positive bias voltage terminal (+) of the remote-supply (or supply) circuit of the forward repeater $5_p$ via a circuit which includes a resistance 723 and a capacitor 724 in parallel. The collector 722 of the transistor 720 is also connected to the input of the non-retriggerable monostable flip-flop 73 and to the clock input C of the counter 74.

The purpose of the timing circuit 72 is to inhibit any interruption, or more exactly any series of zeros, which may normally exist in a PCM signal carried by the line $3_{p-}$. It is known that a HDBn code signal cannot include, by definition, more than n consecutive zero digits. In the current case, the signal HDB3+ fed into the input 711 of the timing circuit 72 can include $2n+1=7$ consecutive zero digits at the most. For a 2048k bits/s PCM line which carries bits lasting 0.49 μs, the PCM signal absences lasting less than or as long as $7 \times 0.49 = 3.3$ μs are not added by the counter 74 and do not trigger the monostable flip-flop 73, when the time constant $t_m$ of the resistive-capacitive circuit 723-724 is greater than 3.3 μs. To avoid any untimely triggering or counting, such as caused by "faulty" repeaters, that have temporarily lost the PCM signal 2048 kHz clock frequency, the time constant $t_m$ is chosen equal to 50 μs, which corresponds to the duration of a hundred of consecutive binary digits. When a series of state "0" bits is fed by each input 711 to the circuit 72 over a time period of less than $t_m$, the transistor 720 turns itself off but the capacitor 724 would not have enough time for discharge. Such an interruption having a period of less than $t_m$ is not taken into consideration by the flip-flop 73 and the counter 74. On the other hand, interruptions longer than $t_m$, which corresponds only to interruptions of the remote locate signals, are taken into consideration. The result is that for a sequence of the first remote locate signal where the fields S are occupied by any given PCM signal which does not have a series of consecutive zeros of length greater than $t_m$, the output signal from the collector 722 has the same envelope as that shown in FIG. 2A, except that the negative going edges are set off to the right by a short period of time equal to $t_m$, comprising binary digits "1".

The monostable flip-flop 73 and the counter-decoder 74 are intended to control the looping of the repeater $5_p$ and $6_p$ via the monitoring terminal equipment as soon as the kth negative going edge which is received by the circuit 7 and included in the first remote locate signal, has been detected. In other words, looping is carried out only in response to the detection of a kth negative going edge of the signal which is transmitted by the output or collector 722 of the circuit 72 in a time interval of less than $T_D$ following the first interruption detected $I_1$ (FIGS. 2A and 2B).

The monostable flip-flop 73 is of the non-retriggerable type, i.e. provides at its output 730 a negative pulse $I_D$ which has a width $T_D$ at least greater than $2(k-1)t$, in response to a negative going edge applied at its input, regardless of the applied signal envelope after this first negative going edge during the time $T_L$. As shown in FIG. 2B, the positive going edge of the pulse $I_D$ is in phase with the rise front of the last interruption $I_k$ of the first sequence received. The width $T_D$ is then equal to $2(k-1)t + T_k = 66$ ms. The monostable flip-flop 73 thus contributes towards limiting the time required to counting the detected negative going clock pulse edges of the FIG. 2A signal in the counter 74. In FIG. 3, this limitation is provided by means of an AND gate 76, one input of which is connected to the output 730 of the flip-flop 73; the output of gate 76 is connected to the zero-resetting input RS of the counter 74 via an OR gate 77. The counter 74 is zero reset when the input RS receives a positive going edge, from the low "0" level to the high "1" level. In response to the first signal negative going edge derived from the circuit 72 and which lies between the sub-fields $S_1$ and $I_1$ (FIG. 2A), the negative output pulse from the flip-flop 73 holds the input RS at zero, whatever the logic signal state of the other input of the AND gate 76; thereby the clock negative going edges of the remote locate signal are counted during the time $T_D$. This other input of the AND gate 76 is connected to the output of a NOR gate whose two inputs are connected to outputs $s_9$ and $s_{10}$ of the counter 74 which are both in the state "1" when the count in the counter 74 is equal to nine or ten.

The output $s_9$ of counter 74 is connected to the control inputs 500 and 600 of the switches 50 and 60 via an inverter 79 and is connected directly to the control input 700 of the switch 70. Once the count in the counter 74 has reached $k=9$, in response to the detection of the kth detected negative going edge in the remote locating sequence, the switches 50 and 60 are open and the switch 70 is closed, as shown by the position of the movable contacts thereof in short dashed lines, FIG. 3. The output $52_p$ of the forward repeater $5_p$ is connected to the input $61_p$ of the backward repeater $6_p$ via the closed loopback path switch 70 and, as a result, the repeater pair is looped via the monitoring end equipment 1. This closing of the loop-back path is held in order to analyse the faults in the looped test signal 5 that are detected by the fault detectors of the equipment 1. The analysis time is equal to the duration of the field $S_{k+1}$ following the pth sequence and preceding the (p+1)th sequence.

The count in the counter 74 is turned off at $k=9$ as long as a $(k+1)th = 10$th clock negative going edge has not been received by the input C of the counter 74. Indeed, on the one hand, the state "1" of the output $s_9$ (FIG. 2C) enables a binary zero in the output pulse (FIG. 2B) from the monostable flip-flop 73 to be coupled through gates 76 and 77 to be fed to input RS of the counter 74 to hold the counter count at zero. On the other hand, when the count of the counter 74 goes from $k=9$ to $k+1=10$, the output $s_9$ (FIG. 2C) is reset to zero which controls unlooping of the repeaters $4_p$ and $5_p$ by opening the switch 70 and by closing the switches 50 and 60; this also causes the output $s_{10}$ (FIG. 2D) to be set to state "1" which turns the counter 10 off at $k+1=10$ by feeding a "1" into the disable input B in the counter 74 and which holds the input RS at zero. Consequently, after the test signal S has been transmitted, the first negative going edge between the fields $S_0$ and $I_0$ of the (p+1)th following sequence for remote locating the following repeater pair $5_{p+1}$-$6_{p+1}$ turns the counter 74 off when $k+1=10$, making the remote locate circuit $7_p$ insensitive to any clock negative going edge received afterwards and, as a result, inhibits the counting and looping control function. Detection of the first negative going edge of the (p+1)th sequence is followed by the switches $50_p$, $60_p$ and $70_p$ returning to the rest position movable contacts in full lines on FIG. 3).

From these descriptions, it appears that the remote locating circuit $7_p$ is protected against any undesirable interference control causing looping of the repeaters $5_p$-$6_p$. As already stated, if the signal S in HDB3 code presents a series of zero digits greater than $n=3$, following losses of clock frequency in the preceding repeaters $5_1$ to $5_{p-1}$, which in practice never have a duration of more than $t_m = 50$ μs, the counter 74 and the monostable flip-flop 73 are unaffected thereby. If one or several successive signal interruptions of length greater than $t_m$ were to be detected and untimely looping were to occur, there must be nine interruptions lying in a period of time not exceeding $T_D$. Should less than nine interruptions occur, the counter 74 counts them and simultaneously the flip-flop 73 emits a negative pulse of duration $T_D$ (FIG. 2B) in response to the first interruption. The positive going edge of the negative pulse in FIG. 2B sets the input RS of counter 74 to "1" and consequently, the counter 74 to zero after such interference interruptions. This prevents the counter from adding imitative and cumulative interruptions analogous to those in a remote locating sequence. In practice, there is a zero or very low probability that nine such interference interruptions, caused by lightning for instance, each having a duration less than $t_m = 50$ μs will occur during an interval of $T_D = 66$ ms.

Furthermore, the fact that after looping the count in the counter 74 is halted at $k+1=10$ and can no longer be turned back, in particular to $k=9$ for controlling a looping, permits step-by-step control of repeater pair loopings, i.e. going from later looping sequences, as shown in FIG. 2A, for the following pairs $5_{p+1}-6_{p+1}$ to $5_p-6_p$. As a secondary consideration, by stopping at $k+1=1$, protection against untimely interruptions in numbers greater than or equal to 10 over a period of time equal to $T_D = 66$ ms is completed, since there is only one transitory looping during period $T_D$ in response to an interruption such as $I_K$. Moreover, monitoring end equipment 1 automatically indicates if one or several interference interruptions become scrambled together in a sequence in the course of a remote locate procedure since practically no test signal is received from the backward channel.

In reference once again to FIG. 1, control unit 11 in the monitoring end equipment 1 comprises, automatic means for supervisoring the remote location of all the repeater pairs in the range 1 to P and for analyzing the test signal characteristics either by automatic control in response to a transmission fault in the normal PCM data signal which is detected on the forward channel $3_1$ to $3_{p+1}$ by the remote end equipment 2, and/or in response to a transmission fault which is detected on the backward channel $4_{P+1}$ to $4_1$ by the monitoring end equipment 1, and/or either by manual control during a link maintenance procedure. Means such as these are also employed for directly remote locating a pair of repeaters of given rank p with a view, for example, to checking out the operation thereof after certain faulty components in a repeater or repeaters of said pair have been replaced.

According to the invention, the remote locate signal generator 10 shown in FIG. 1 comprises several signal generators 100 to 102 adapted for remote location and testing procedures.

A generator 100 produces a test signal amongst other signals that is selected by the control unit 11. At least one of these test signals is a pseudorandom signal.

A generator 101 produces the remote locating sequences. In fact, amongst the P remote locating sequences produced by the generator 101, the first one is intended for looping the first repeater pair $5_1-6_1$ and is not strictly identical to the following $(P-1)$ sequences, as shown in FIG. 2A. Because the forward repeater $5_1$ is not preceded by any other repeater on the forward channel, the interruption $I_0$ of the first sequence is counted by the counter 74 of the remote locating circuit $7_1$. The first sequence is thus identical with that described as per FIG. 2A, except that it does not include the sub-fields $I_{k-1}$ and $S_k$. The first sequence, shown in FIG. 2F, is composed of sequential sub-fields $I_0$, $S_1$, $I_1$, . . . $I_{k-2} = I_7$, $S_{k-1} = S_8$, $I_k$. The negative going edge immediately following the sub-field $S_{k-1} = S_8$ causes looping in the repeaters $5_p-6_p$ or the closing of the loopback path switch $70_1$, before the pulse $I_D$ *at the output 730 of the flip-flop 73 of the remote locate circuit* $7_1$ has ended, as shown in FIG. 2G. FIGS. 2H and 2I show the state of the outputs $s_9$ and $s_{10}$ of the counter 74 in the circuit $7_1$.

Naturally, the first sequence can only be composed of the alternate sub-fields $S_2$ to $S_k$ and $I_1$ to $I_k$ in FIG. 2A.

Consequently, to remotely locate a pair of repeaters $5_p-6_p$, the generator 101 feds initially the first sequence shown in FIG. 2F to the forward channel 3 under control of the control unit 11, then $p-1$ sequences as shown in FIG. 2A. If the pair of repeaters $5_p-6_p$ are to be directly remotely located, the sequences follow on from one another immediately, with a very short period of time between them, greater than $T_L$. On the other hand, when looking for faults in the line, a test signal emission between each sequence is provided by the generator 100. The test signals are analyzed by the control unit 11 comparing the signals leaving the generator 100 and received by coupler 12 via backward channel $4_1$ after each pair of repeaters has been looped.

Lastly, a third generator 102 transmits a second so-called remote locate end signal, as shown in FIG. 2E, for unlooping the last pair of looped repeaters, e.g. rank p, and for zero-resetting all the counters 74 in the remote locate circuits $7_1$ to $7_p$, under control of the unit 11. In the monitoring equipment 1, the outputs of the generators 100, 101, 102 are connected to the inputs of a mixer 103, having an output connected to the upstream or entrance end of the first line section $3_1$ on the forward channel via the coupler 12 of the monitor equipment 1. This coupler 12 comprises at least one binary-to-bipolar converter and a forward repeater which are peculiar to the monitor terminal, together with a bipolar-to-binary converter and repeater which are associated with the backward channel. It will be noted that in the case of the coupler 12 in the terminal 1 comprising a pair of repeaters, then this pair plays the role of the first pair $5_1-6_1$.

The remote locate procedure for a pair of repeaters of rank p comes into effect as follows, under orders from the unit 11.

The generator 100 emits a selected test signal. The generator 101 emits firstly the first remote locate sequence (FIG. 2F), then a series of practically consecutive remote locate sequences $(p-1)$, such as shown in FIG. 2A, which cut into the test signal via the mixer 103. Two consecutive sequences are spaced by a period of time longer than $T_L$. The kth=ninth negative going edge of the first sequence transitorily loops the first pair of repeaters $5_1$, $6_1$ until the $(k+1)$th=tenth negative going edge is received: the tenth negative trailing edge corresponds to the first negative trailing edge of the second sequence, to stop the counter 74 in the remote locate circuit $7_1$, at $(k+1)=10$ and unloop the repeaters $5_1$ and $6_1$. Closure of the switches $50_1$ and $60_1$ of the rank 1 pair allows passage of the sub-fields $S_1$ to $S_k$ of the second and following sequences. This procedure is repeated for each rank 2 to p sequence respectively in the remote locate circuits $7_2$ to $7_p$. Each remote locate circuit $7_1$ to $7_p$ provides the passage to the following pair of higher rank sequences respectively. During momentary looping of a pair of repeaters, the following pairs are disconnected from the monitoring and equipment 1 and, as a result of this interruption in the PCM signal, the counters 74 of the following remote locate circuits are reset to zero by means of their respective monostable flip-flop 75.

Referring to FIG. 3, the retriggerable monostable flip-flop 75 has an input which is connected to output lead 711 of the bipolar-to-binary converter 71; the output of flip-flop 75 is connected to the other input of the OR gate 77 which controls the zero resetting input RS of the counter 74. The flip-flop 75 is of the retriggerable type, it emits a negative pulse of length $T_E$, as shown in FIG. 2E, in response to a negative going edge in the outgoing signal on lead 711 which is not followed by other interruptions during the time $T_E$. The time $T_E$ is longer then $T_D$ and is equal, for example, to $2T_L = 204$ ms. Consequently, when the bipolar-to-binary converter 71 transmits a remote locate sequence for locating the associated repeater pair, the flip-flop 75 output goes over from the "1" to the "0" state (FIG. 2E) in response to the first received negative going edge, then perhaps, goes over from the "0" to "1" state after a time $T_M - t + T_E$ (or $T_D - t + T_E$ for the first sequence; FIG. 2F), if no negative going edge follows the last sequence edge between fields $S_k$ and $I_k$ (FIG. 2A) (or fields $S_{k-1}$ and $I_k$: FIG. 2F). However, in view of the fact that the state of the flip-flop 75 output is sensitive to any negative going edge in the digital signal received and in a remote locating sequence, the state of the flip-flop 75 output has no effect on the zero-setting of the counter 74. This because a pulse having the duration $T_D$ is derived by the flip-flop 73 while the "1" state of the outputs $s_9$ (FIG. 2C) and $s_{10}$ (FIG. 2D) of the counter 74 hold the input RS of the counter 74 at zero. Zero-resetting of the count in the counter 74 under control of the flip-flop 75 can only take place when the signal transmitted by the converter 71 is totally interrupted during a period of time equal at least to $T_E$.

Such an interruption is delivered by the generator 102 at the end of the remote locating procedure, such as described above, in order to zero-reset all the counters 74 in the remote locating circuits $7_1$ to $7_p$ and, thus, to set the output $s_9$ of the counter 74 of the remote locate circuit $7_p$ to state "0" and to unloop the repeaters $5_p$ and $6_p$ and open the loop-back path switch $70_p$. In addition, generally speaking, to take precautions against any erroneous unlooping or looping, an interruption of length greater than or equal to $T_L$ is produced between the looping and the unlooping moments of the preceding pairs of rank 1 to $p-1$. This enables the counter to be zero-reset prior to reception of the remote locate sequence peculiar to the pair in question. However, this is not normally necessary as certain interruptions, if received by the remote locate circuits downstream of the repeater pair is to be looped, never have a number more than k during a time $T_D$. Furthermore, should an analysis last more than $T_E$, then the counters 74 of the circuits 7 upstream are held at zero by the associated flip-flops 75.

In another embodiment, the remote locate sequences can follow on one from another with durations of less than $T_L$ when the transmission delay of a sequence across a forward repeater $5_p$ is greater than $T_L$. If in practice, the repeater does not provide a delay such as this, a delay network 53, shown in FIG. 3, is inserted in each pair in series with the repeater $5_p$ and upstream of the switch $50_p$. The delay imposed by the network 53 is such that when added to that imposed by the repeater $5_p$, the overall delay is of the same order of magnitude as $T_L$, for the sequence peculiar to the pair in question not to be transmitted towards the following forward repeaters after the loop in question has been looped.

However, such delay network is generally not necessary since, were the rank 2 to P remote locate circuits to receive the first remote locate sequence and the following circuits were to control looping of the associated repeaters, each pair can automatically be unlooped and the associated counter be zero-reset by an interruption of length greater than $T_L$ following each sequence preceding the remote locate sequence specific to the pair considered.

Although the invention has been described in reference to a preferred embodiment, as regards the PCM link structure, a remote locating system in accordance with this invention can be applied to other types of PCM link. These relate to Hertzian radio link or optical fibre lines. The intermediate amplifying circuits (repeaters, Hertzian repeating stations) can be remote supplied or locally supplied. The communication medium can be analog, digital or hybrid type; a hybrid transmission line includes analog transmission line sections between the intermediate amplifying circuits and digital transmission parts designating the intermediate amplifying circuits after analog-to-digital conversion and before digital-to-analog conversion. Whatever the case, the remote locate signals are carried by the same transmission medium as the PCM signal.

In addition, the positions taken by the switches 50, 60 and 70 can be different from those depicted in FIG. 3. Indeed, the loop-back path can be introduced between any two terminals in the forward and backward repeaters of a pair, each terminal being either a repeater input or output. One of the switches 50 or 60 and the switch 70 can be made up of a straight-forward two-state switch with no intermediate position. These switches are of the relay or preferably transistor type drawing low current.

In this respect, the switches 50, 60 and 70 can be inserted between component circuits of the respective repeaters 5, 6. Such an embodiment is illustrated in FIG. 4 in which the internal organization of each repeater has been shown in detail.

Each repeater $5_p$, $6_p$ comprises, in series starting from its input $51_p$, $61_p$, impedance matching means such as a transformer 54, 64, an equalizer 55, 65, a regenerating circuit 56, 66 for regenerating the received bipolar signal, a bipolar-to-binary converter 57, 67 and an output amplifying circuit 58, 68, which reconverts the digital component signals $HDB3^{+0}$ and $HDB3^-$ into an amplified bipolar signal which is delivered at the outputs $52_p$, $62_p$.

Figure 4:
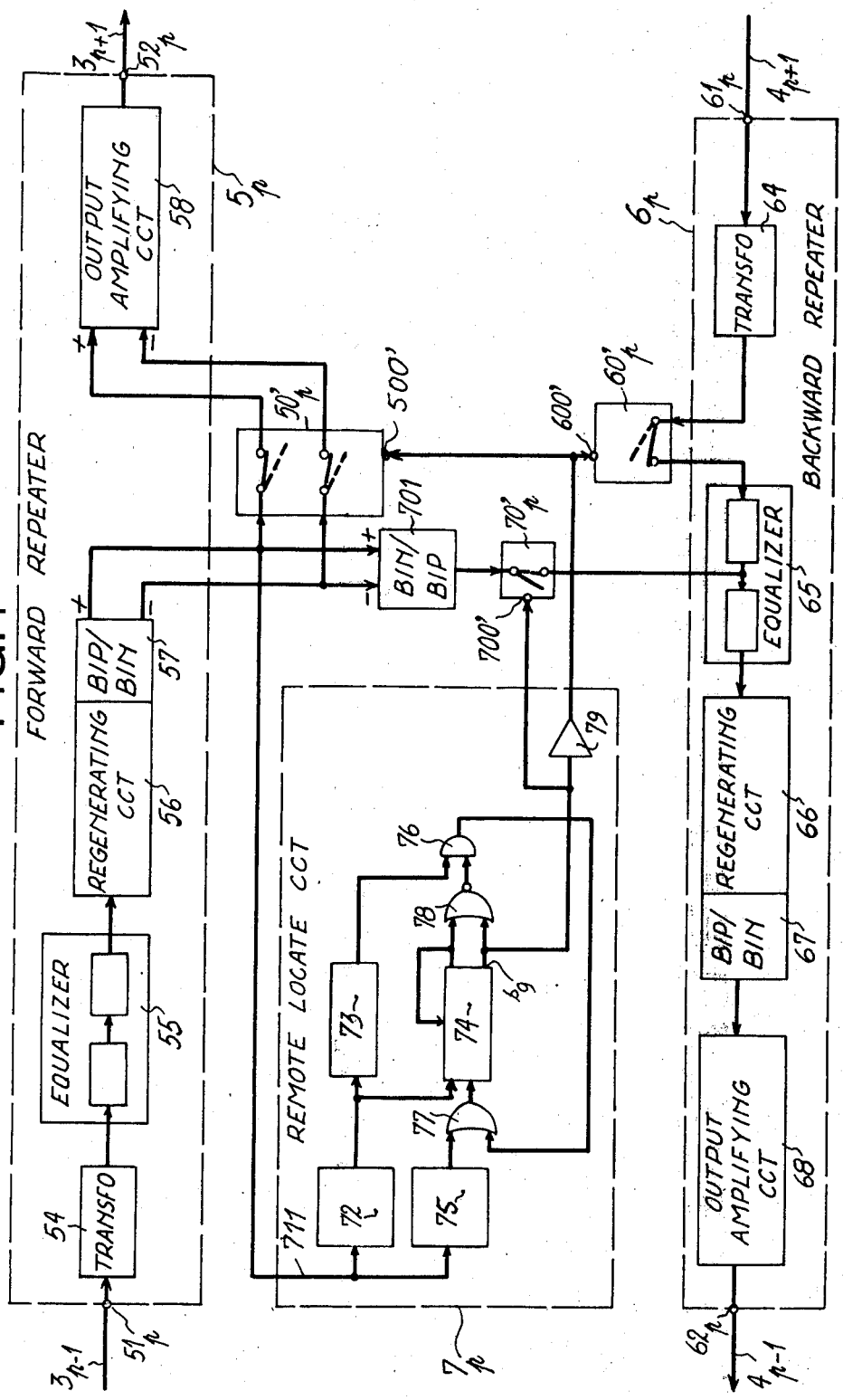
FIG. 4 is a detailed block diagram, analogous to the diagram in FIG. 3, of another embodiment relating to interconnecting of the remote locate circuit with respect to the component circuits of the two associated repeaters.

As shown in FIG. 4, the switching means analogous to the simple switches $50_p$, $60_p$ in FIG. 3, are replaced by a double switch $50'_p$ and a single switch $60'_p$ respectively. The double switch $50'_p$ is interconnected between the parallel output terminals + and − of the converter 57 and the input terminals + and − of the output amplifying circuit 58 which are included in the forward repeater $5_p$. The single switch $60'_p$ is interconnected between the output of the transformer 64 and the input of the equalizer 65 which are included in the backward repeater $6_p$.

The remote locate circuit $7'_p$ is identical to that already described for FIG. 3, apart from the fact that it does not include the bipolar-to-binary converter 71; the common input 711 to the circuits 72 and 75 is connected to the output + of the converter 57 which transmits the binary component signal HDB3+.

The loop-back circuit is also composed of a single switch $70'_p$ whose input is connected to the output of a binary-to-bipolar converter 701, the inputs + and − of which are respectively connected to the outputs + and − of the converter 57 of the forward repeater. The output of the switch $70'_p$, when closed, transmits the looped bipolar signal between two components of the equalizer 65, e.g. in the gain regulation circuit direct chain.

The switches $50'_p$, $60'_p$ and $70'_p$ receive on the control inputs 500′, 600′ and 700′ the logic signals coming respectively from the inverter 79 and the output $s_9$ of the counter 74 of the remote locate circuit $7_p$. They are controlled in an identical way to that described previously for the switches $50_p$, $60_p$ and $70_p$.

The switch interconnections shown in FIG. 4 have been chosen in accordance with selection criteria of the relatively high levels of the received bipolar signals. In the forward channel, the binary signal used by the remote locate circuit $7_p$ for detecting the interruption has been regenerated and reshaped, and in the backward channel the bipolar signal is regenerated and amplified in the backward repeater $6_p$.

What we claim is:

1. A system for step-by-step remote locating pairs of first and second amplifying means respectively included in first and second transmission channels of a bidirectional digital transmission medium between first and second end means, said first end means comprising first generating means for generating on said first channel remote locate sequences composed of first interruptions in a digital signal conveyed by said first channel, and second generating means for generating a locate end interruption in said digital signal on said first channel, each interruption being longer than the duration of the maximum series of consecutive zero digits that said digital signal can contain and each of said first interruptions being shorter than said locate end interruption, each of said remote locate sequences being intended to command closing of a loop-back path between said first and second amplifying means of a respective pair and comprising (a) a predetermined integral number k (k≧2) of first nonconsecutive interruptions during a predetermined period of time and, (b) with the exception of the first sequence generated and intended to command the nearest amplifying means pair of said first end means, an interruption which precedes said first interruptions of said sequence and which is intended for opening said loop-back path of the preceding amplifying means pair, each pair of amplifying means being associated with switching means for closing and opening the respective loop-back path of said amplifying means pair, detecting means for detecting said locate end interruption, and detecting and counting means for detecting and counting said first interruptions thereby controlling said switching means in the closed loop-back path position when the count of said detecting and counting means is equal to k, and in the opened loop-back path position when the count of said detecting and counting means is different from k, said detecting and counting means automatically returning to zero in response to a count less than k during said predetermined period of time or in response to a locate end interruption under the control of said detecting means.

2. A system as claimed in claim 1 wherein said detecting and counting means comprises sequence interruption detecting means for producing a pulse having a width equal to said predetermined period of time in response to any detected interruption whatever the subsequent detected interruptions during said predetermined period of time following said any detected interruption, interruption counting means for controlling said switching means in said closed loop-back path position when the count of said counting means is equal to k, and in said opened loop-back path position when the count of said counting means is different from k, means connected to said sequence interruption detecting means and to said counting means for zero-resetting said counting means when its count is less than k at the end of said pulse having said width equal to said predetermined period of time, and means for stopping said counting means at k+1 once said count has reached k+1.

3. A system as claimed in claim 2 wherein said sequence interruption detecting means includes a non-retriggerable monostable flip-flop which is sensitive to the trailing edge of said interruption and which produces pulses having said width equal to said predetermined period of time.

4. A system as claimed in claim 1 or 2 wherein said locate end interruption detecting means comprises a retriggerable monostable flip-flop which is sensitive to the trailing edge of said interruptions and which produces pulses having a width greater than said predetermined period of time and equal to the width of said locate end interruption.

5. A system as claimed in claim 1 comprising, associated with each pair of amplifying means and connected between the input of said detecting and counting means and said first channel, means for converting said digital signal in line-code into a binary signal having bits with a first state corresponding to the same high level bits of said digital signal, and means for inhibiting any interruption in the binary signal having a duration at least equal to said duration of said maximum series of consecutive bits of a second state of said digital signal.

6. A system as claimed in claim 5 wherein said inhibiting means comprises a common-emitter transistor having a collector connected to said input of said detecting and counting means, a parallel resistive and capacitive means having a time constant at least equal to said duration of said maximum series of consecutive bits of the second state of said digital signal.

7. A system as claimed in claim 5 or 6 wherein the input to said locate end interruption detecting means is connected to the output of said converting means.

8. A system as claimed in claim 1, or 2, or 5 comprising means along said first channel between the input of said switching means of each amplifying means pair and the inputs of said detecting and counting means and said locate end detecting means for delaying said digital signal by at least said predetermined period of time.

9. In a remote station of a system for step-by-step remote locating pairs of first and second amplifying means at the remote station, the first and second amplifying means being respectively included in first and second transmission channels of a bidirectional digital transmission medium between first and second end means, the first end means generating on said first channel remote locate sequences composed of first interruptions in a digital signal conveyed by said first channel and generating a locate end interruption in said digital signal on said first channel, each interruption being longer than the duration of the maximum series of consecutive zero digits that said digital signal can contain and each of said first interruptions being shorter than said locate end interruption, each of said remote locate sequences being intended to command closing of a loop-back path between said first and second amplifying means of the respective pair and including (a) a predetermined integral number k (k≧2) of first nonconsecutive interruptions during a predetermined period of time, and (b) with the exception of the first sequence generated and intended to command the nearest amplifying means pair of said first end means, an interruption which precedes said first interruptions of said sequence and which is intended for opening said loop-back path of the preceding amplifying means pair, the combination of:

detecting means for detecting said locate end interruption, detecting and counting means for detecting and counting said first interruptions for closing the loop-back path when the count of said detecting and counting means is equal to k, and for opening the loop-back path when the count of said detecting and counting means is different from k, and means for returning said detecting and counting means to zero in response to a count less than k during said predetermined period of time or in response to a locate end interruption being detected by said detecting means.

10. The station of claim 9 wherein said detecting and counting means comprises sequence interruption detecting means for producing a pulse having a width equal to said predetermined period of time in response to any detected interruption whatever the subsequent detected interruptions during said predetermined period of time following said any detected interruption, interruption counting means for closing said loop-back path when the count of said counting means is equal to k and for opening said loop-back path when the count of said counting means is different from k, means connected to said sequence interruption detecting means and to said counting means for zero-resetting said counting means when its count is less than k at the end of said pulse having said width equal to said predetermined period of time, and means for stopping said counting means at k+1 once said count has reached k+1.

11. The station of claim 10 wherein said sequence interruption detecting means includes a non-retriggerable monostable flip-flop which is sensitive to the trailing edge of said interruption and which produces pulses having said width equal to said predetermined period of time.

12. The station of claim 10 or 11 wherein said locate end interruption detecting means comprises a retriggerable monostable flip-flop which is sensitive to the trailing edge of said interruptions and which produces pulses having a width greater than said predetermined period of time and equal to the width of said locate end interruption.

13. The station of claim 9 further including means for converting said digital signal in line-code into a binary signal having bits with a first state corresponding to the same high level bits of said digital signal, and means for inhibiting any interruption in the binary signal having a duration at least equal to said duration of said maximum series of consecutive bits of a second state of said digital signal.

14. The station of claim 13 wherein said inhibiting means comprises a common-emitter transistor having a collector connected to said input of said detecting and counting means, a parallel resistive and capacitive means having a time contant at least equal to said duration of said maximum series of consecutive bits of the second state of said digital signal.

15. A remote station of a system for step-by-step remote locating pairs of first and second amplifying means respectively included in first and second transmission channels of a bidirectional digital transmission medium between first and second end means, the first end means generating on said first channel remote locate sequences composed of first interruptions in a digital signal conveyed by said first channel and generating a locate end interruption in said digital signal on said first channel, each interruption being longer than the duration of the maximum series of consecutive zero digits that said digital signal can contain and each of said first interruptions being shorter than said locate end interruption, the station comprising:

the first and second amplifying means, a loop-back path selectively closed between the first channel and the second channel for connecting at least one of the first and second amplifying means to be responsive to the signal received at the station, each of said remote locate sequences being intended to command closing of the loop-back path between said first and second amplifying means of a respective pair and including (a) a predetermined integral number k (k≧2) of first nonconsecutive interruptions during a predetermined period of time and, (b) with the exception of the first sequence generated and intended to command the nearest amplifying means pair of said first end means, an interruption which precedes said first interruptions of said sequence and which is intended for opening said loop-back path of the preceding amplifying means pair, detecting means for detecting said locate end interruption, detecting and counting means for detecting and counting said first interruptions for closing the loop-back path when the count of said detecting and counting means is equal to k, and for opening the loop-back path when the count of said detecting and counting means is different from k, and means for returning said detecting and counting means to zero in response to a count less than k during said predetermined period of time or in response to a locate end interruption being detected by said detecting means.

\* \* \* \* \*